Figures 1, 2:
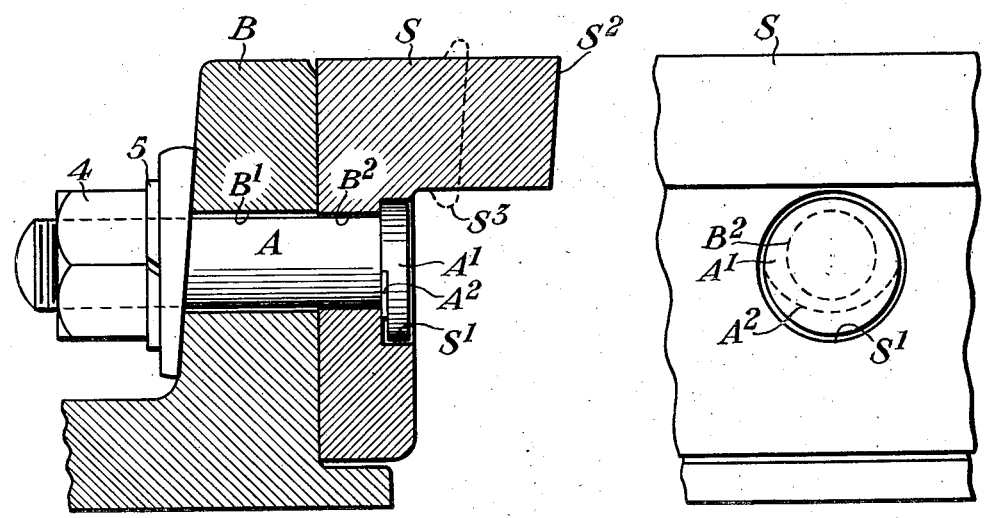

April 16, 1935.  H. L. BONE  1,998,116

CAR RETARDER STRUCTURE

Filed July 11, 1933

INVENTOR
Herbert L. Bone
BY
HIS ATTORNEY

Patented Apr. 16, 1935

1,998,116

UNITED STATES PATENT OFFICE 1,998,116

CAR RETARDER STRUCTURE

Herbert L. Bone, Pittsburgh, Pa., assignor to The Union Switch & Signal Company, Swissvale, Pa., a corporation of Pennsylvania Application July 11, 1933, Serial No. 679,875

1 Claim. (Cl. 85—9)

My invention relates to car retarder structures, and particularly to that part of such structures which involves a brake beam, a brake shoe, and means for attaching the shoe to the beam.

One feature of my invention is the provision of a structure of this kind permitting the use of a bolt which has maximum strength for a given size, and which is capable of being easily replaced in the event of breakage.

I will describe one form of car retarder structure embodying my invention, and will then point out the novel features thereof in claim.

In the accompanying drawing, Fig. 1 is a transverse sectional view through a car retarder structure embodying my invention. Fig. 2 is a front view of the structure shown in Fig. 1.

Similar reference characters refer to similar parts in each of the views.

Referring to the drawing, the reference character B designates the usual brake beam, to which a shoe S is attached by means of a bolt A. The shoe is in the form of an inverted L, with the vertical leg in contact with the brake beam B, and with the horizontal leg extending away from the beam and terminating in the usual wheel-engaging surface $S^2$.

The beam B is provided with a hole $B^1$, and the shoe S is provided with a hole $B^2$, which holes are in registry to receive the shank of the bolt A. The hole $B^2$ is eccentrically countersunk at $S^1$, the bulge of the countersink being on the side of the hole opposite to the horizontal leg of the shoe S. The bolt A is provided with an eccentric head $A^1$, which fits the eccentric countersink in the shoe, thereby preventing the bolt from turning with respect to the shoe and beam. The other end of the bolt A is threaded to receive a nut 4, the usual lock washer 5 being interposed between this nut and the brake beam B.

Preferably the inner face of the bolthead is cut away at $A^2$ to avoid the eccentric load on the bolt which would occur should the entire bolthead be in engagement with the base of the countersink and which would tend to cause bending stresses in the bolt when the nut 4 is tightened.

As the wheel-engaging surface $S^2$ of the shoe S wears, this surface rolls over and forms a bead at the top and bottom, which bead is indicated by the dotted line $S^3$. This bead makes it difficult to remove the ordinary bolt from the brake shoe unless the bolt holes are low enough to permit the bolthead to clear the beam, and this is a condition which is not desirable from the point of view of strength and clearance. It is desirable, however, that the bolt should be easily removable so that it can be taken out if it should break or if removal and use again after the brake shoe has been worn to its condemning limit is desirable. In a structure embodying my invention only a small amount of the bead $S^3$ will overhang the upper part of the bolthead $A^1$, and since the bolt is preferably made of high grade hard steel, it will act as a punch when driven out, thereby cutting the bead and permitting easy removal of the bolt.

By making both the bolt and the brake shoe of hard material, sufficient bearing surface for the head of the bolt against the brake shoe may be provided and yet the center line of the bolt may be kept as close as possible to the horizontal leg of the shoe.

The use of a bolt instead of the customary stud for attaching the brake shoe to the brake beam eliminates the necessity for threads in the brake shoe, and the elimination of these threads at the points of greatest stress, that is, at the joint between the brake shoe and the brake beam, provides for maximum strength for a bolt of given size.

Although I have herein shown and described only one form of car retarder structure embodying my invention, it is understood that various changes and modifications may be made therein within the scope of the appended claims without departing from the spirit and scope of my invention.

Having thus described my invention, what I claim is:

In combination, two separable members and a bolt for clamping said members together, the first of said members being L-shaped with one leg in contact with the surface of the second member and the other leg extending away from the second member, said second member and the first leg of the first member having formed therein registering bolt holes located a short distance from the second leg of the first member, and the hole in the first member being eccentrically countersunk with the bulge of the countersink on the side of the hole opposite to the second leg, said bolt being provided with an eccentric head which fits the eccentric countersink in the first member and the inner face of said bolt head being cut away at the bulge to avoid excessive eccentric loading of the bolt.

HERBERT L. BONE.